US009954791B2

(12) United States Patent
Sreeramoju

(10) Patent No.: US 9,954,791 B2
(45) Date of Patent: Apr. 24, 2018

(54) NETWORK INTERFACE SELECTION FOR NETWORK CONNECTIONS

(71) Applicant: Nicira, Inc., Palo Alto, CA (US)

(72) Inventor: Akshay Kumar Sreeramoju, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 181 days.

(21) Appl. No.: 14/752,958

(22) Filed: Jun. 28, 2015

(65) Prior Publication Data

US 2016/0380902 A1 Dec. 29, 2016

(51) Int. Cl.
*H04L 12/50* (2006.01)
*H04L 12/805* (2013.01)
*H04L 12/801* (2013.01)
*H04L 29/06* (2006.01)
*H04L 12/741* (2013.01)
*H04L 12/721* (2013.01)

(52) U.S. Cl.
CPC ............. *H04L 47/36* (2013.01); *H04L 47/18* (2013.01); *H04L 47/193* (2013.01); *H04L 69/16* (2013.01); *H04L 45/26* (2013.01); *H04L 45/745* (2013.01)

(58) Field of Classification Search
CPC ..................................... H04L 47/36
USPC .......................................... 370/401
See application file for complete search history.

(56) References Cited

U.S. PATENT DOCUMENTS

2005/0281288 A1* 12/2005 Banerjee ................ H04L 47/10
370/477
2016/0374133 A1* 12/2016 Logue ................... H04W 8/005

* cited by examiner

*Primary Examiner* — Dang Ton
(74) *Attorney, Agent, or Firm* — Su IP Consulting

(57) ABSTRACT

An example method is provided to perform egress network interface selection for a network connection with a second endpoint device. The method may comprise: detecting multiple egress network interfaces of the first endpoint device that are capable of communicating with the second endpoint device via multiple routes, wherein each route involves one of the multiple egress network interfaces; and selecting, from the multiple network egress interfaces, an egress network interface based on multiple maximum transmission unit (MTU) values associated with the multiple routes. The method may further comprise setting a size limit for packets transmitted from the second endpoint device to the first endpoint device during the network connection; configuring a connection establishment packet that includes the size limit to establish the network connection; and sending the connection establishment packet to the second endpoint device via the selected egress network interface.

21 Claims, 6 Drawing Sheets

US 9,954,791 B2

NETWORK INTERFACE SELECTION FOR NETWORK CONNECTIONS

BACKGROUND

Unless otherwise indicated herein, known approaches described are not admitted to be prior art by inclusion throughout the present disclosure.

Communications networks are generally packet-switched networks that operate based on Internet Protocol (IP). When one host has a large amount of data to send to another host, the data may be transmitted as a series of packets. For example, transmission Control Protocol (TCP) enables two hosts (also called "endpoints" or "endpoint devices") to establish a network connection and exchange streams of data. Both IP and TCP define size limits for packets transmitted over a network. For example, a maximum transmission unit (MTU) may be configured for a network interface to set the maximum size of IP packet that can be transmitted via the network interface.

For example, a Maximum Segment Size (MSS) value may be used to define the maximum number of data bytes in a packet (e.g., excluding the TCP/IP headers) that a host device can receive in a single, unfragmented piece. If the MSS value is set too high, packets that are too large to send will require fragmentation and reassembly. Fragmenting a packet generally involves dividing the packet into smaller fragments, which causes more overhead to wait until all fragments are received and to reassemble the fragments. Since each fragment generally has the same header overhead as the original packet, the total number of bytes that needs to be transmitted also increases. On the other hand, an MSS value that is set too low may result in an inefficient use of the available bandwidth.

DETAILED DESCRIPTION

Figure 1:
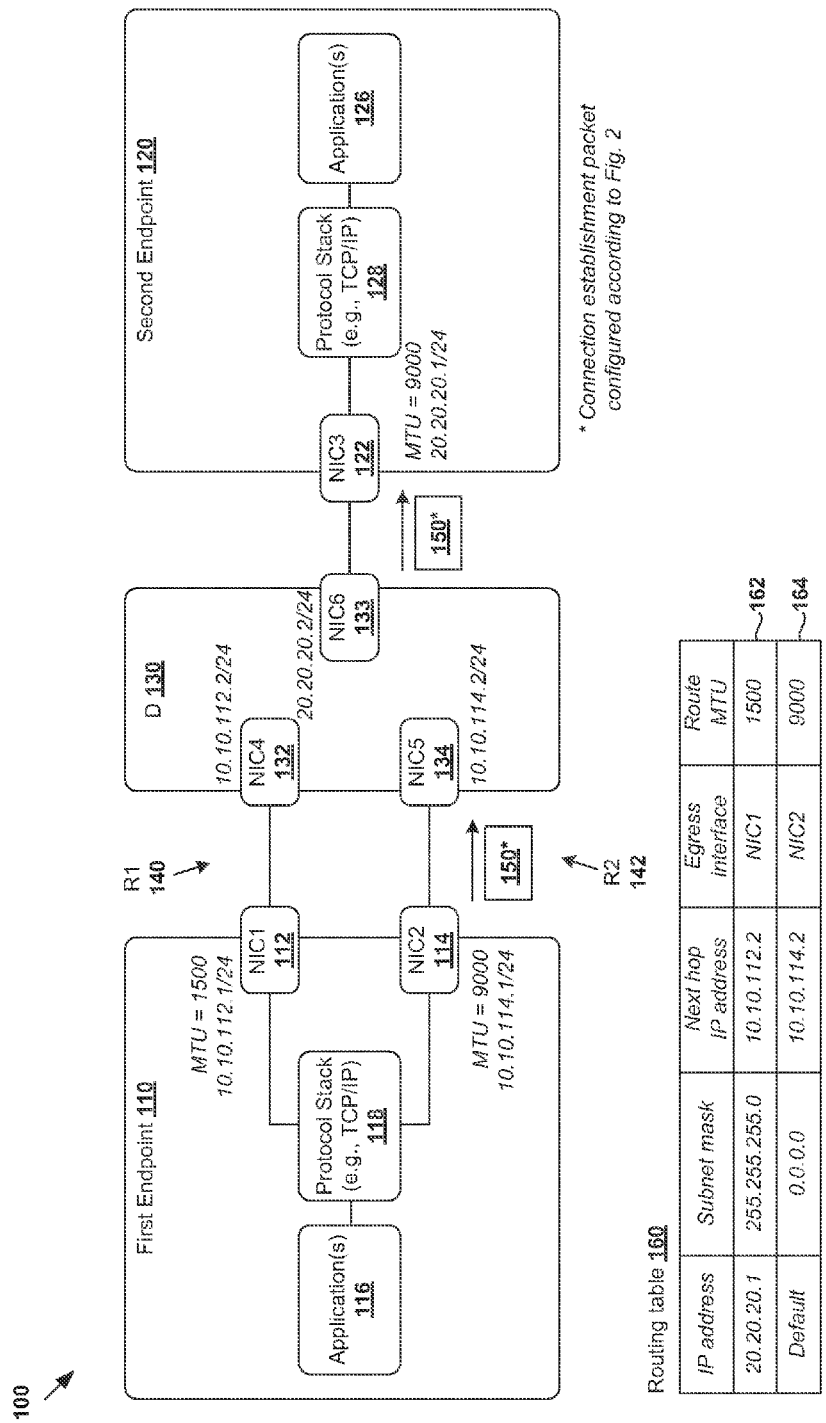
FIG. 1 is a schematic diagram of an example communications network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

For network connections such as a TCP connection, a Maximum Segment Size (MSS) value is usually set based on the Maximum Transmission Unit (MTU) of an egress network interface. However, in cases where an endpoint device has multiple egress network interfaces, the size limit defined by the MSS value may not be optimally set. An example will now be described using FIG. 1, which is a schematic diagram of example communications network environment 100. Although an example is shown, network environment 100 may include additional or alternative components depending on the desired implementation. Network environment 100 may be any suitable network, such as wide area network (e.g., Internet), virtual private network, virtualized computing network, etc.

In FIG. 1, network environment 100 includes endpoint devices such as first endpoint 110 and second endpoint 120 that communicate via intermediate device 130 (e.g., router "D"). In particular, "NIC4" 132 (e.g., on 10.10.112.2/24) and "NIC5" 134 (e.g., on 10.10.114.2/24) of intermediate device 130 are connected to network interfaces "NIC1" 112 (e.g., on 10.10.112.1/24) and "NIC2" 114 (e.g., on 10.10.114.1/24) of first endpoint 110 respectively, and "NIC6" 133 of intermediate device 130 (e.g., on 20.20.20.2/24) to "NIC3" 122 (e.g., on 20.20.20.1/24) of second endpoint 120. Although one is shown for simplicity, there may be additional intermediate devices 130 connecting first endpoint 110 and second endpoint 120 in practice. Also, first endpoint 110 and second endpoint 120 may have additional network interfaces.

Throughout the present disclosure, the term "endpoint" or "endpoint device" may refer generally to an end point of a bi-directional inter-process communication flow across a network. For example, such endpoint or endpoint device may be capable of creating a socket for the communication flow, such as Transmission Control Protocol (TCP) sockets, raw Internet Protocol (IP) sockets, etc. Further, the term "network interface" may refer generally to any suitable component that connects an endpoint device to a network, such as a physical network interface card (NIC) or virtual network interface card (vNIC), etc.

The term "egress network interface" refers to a network interface via which egress or outgoing traffic is sent to another device (e.g., intermediate device 130). The term "ingress network interface" refers to a network interface via which ingress or incoming traffic is received from another device (e.g., intermediate device 130). The term "traffic" may refer generally to a group of bits that can be transported together from a source to a destination, such as in the form of packets, frames, messages, datagrams, etc.

Each endpoint 110/120 may execute application(s) 116/126 having access to TCP/IP stack 118/128 that is divided into several layers, such as transport layer (e.g., TCP or User Datagram Protocol (UDP)), network layer (e.g., IP layer), etc. For example, when a web browser application on second endpoint 120 (i.e., acting as a client) connects to first endpoint 110 (i.e., acting as a server), a TCP session or connection may be established between first endpoint 110 and second endpoint 120 to facilitate a web browsing session. Depending on their role during the TCP connection, first endpoint 110 and second endpoint 120 may be referred to as an active endpoint (AEP) device, passive endpoint (PEP) device, etc.

During a TCP connection, first endpoint 110 and second endpoint 120 exchange data in the form of segments, whose size is limited by the maximum IP payload (e.g., 65,365 bytes). The TCP connection may be established via a three-way handshake, which includes the transmission of (1) a synchronization (SYN) packet, (2) a synchronization-acknowledgement (SYN-ACK) packet and finally (3) an acknowledgement (ACK) packet. In the example in FIG. 1, first endpoint 110 may send a SYN packet to second endpoint 120 to initiate the establishment of a TCP connection. Second endpoint 120 may then respond with a SYN-ACK packet, followed by first endpoint 110 responding with an ACK packet to complete the handshake.

The SYN packet transmitted by first endpoint 110 includes a size limit in the form of an MSS value to inform second endpoint 120 of the largest amount of data first endpoint 110 is willing to receive from second endpoint 120. For example in FIG. 1, the SYN packet may be configured with MSS=9000 bytes based on the MTU=9000 bytes of "NIC2" 114 or MSS=1500 bytes based on the MTU=1500 bytes of "NIC1" 112. In particular, if "NIC1" 112 is used, the communication takes place via first route "R1" 140 involving "NIC1" 112, "D" 130 and "NIC3" 122. Otherwise, if "NIC2" 114 is used, the communication takes place via alternative second route "R2" 142 involving "NIC2" 114, "D" 130 and "NIC3" 122.

Similarly, the SYN-ACK packet transmitted by second endpoint 120 includes an MSS value to inform first endpoint 110 of the largest amount of data second endpoint 120 is willing to receive from first endpoint 110. Since second endpoint 120 only has one network interface, the SYN-ACK packet may be configured with MSS=9000 bytes based on the MTU=9000 bytes of "NIC3" 122. In practice, the MTU value of a network interface is usually manually configured (e.g., by a network administrator or manufacturer) to define the maximum size of a packet that can be transmitted via the network interface.

Although either "NIC1" 112 or "NIC2" 114 of first endpoint 110 may be used to send the SYN packet, the network interfaces may have different MTU values. For example, the minimum payload allowed on an Ethernet frame is generally limited to 1500 bytes, while faster networks (e.g., Gigabit Ethernet) allow larger packets up to around 9000 bytes. In the example in FIG. 1, "NIC1" 112 is configured with MTU=1500 bytes, while "NIC2" 114 with MTU=9000 bytes. This means that "NIC2" 114 is capable of transmitting larger packets compared to "NIC1" 112. If the TCP connection involves a large amount of data, it is more efficient to use second route "R2" 142 involving "NIC2" 114.

Conventionally, although second route "R2" 142 via "NIC2" 114 may facilitate higher throughput, first endpoint 110 may use first route "R1" 140 via "NIC1" 112 to transmit data during a TCP connection. For example, this occurs when first route "R1" 140 is configured as a static route to reach second endpoint 120 (see 162 in routing table 160). The static route may be added manually (e.g., by a network administrator) to routing table 160 of first endpoint 110, assigned using Dynamic Host Configuration Protocol (DHCP), etc. This necessitates first endpoint 110 to use the static route to send the SYN packet to second endpoint 120. In this case, the MSS value of the SYN packet is set to MSS=1500 bytes based on the MTU=1500 bytes of "NIC1" 112. This outcome is less than ideal and generally leads to sub-optimal throughput.

According to examples of the present disclosure, egress network interface selection may be performed to reduce the likelihood of, if not avoid, the above scenario where alternative routes with different or better MTU values are ignored when establishing a TCP connection. For example, instead of merely following a static route in the routing table, egress network interface selection may be performed based on the MTU value associated with multiple routes and network interfaces. In the example in FIG. 1, this allows first endpoint 110 to consider all available routes to second endpoint 120 via different egress network interfaces to achieve better throughput and bandwidth efficiency.

Figure 2:
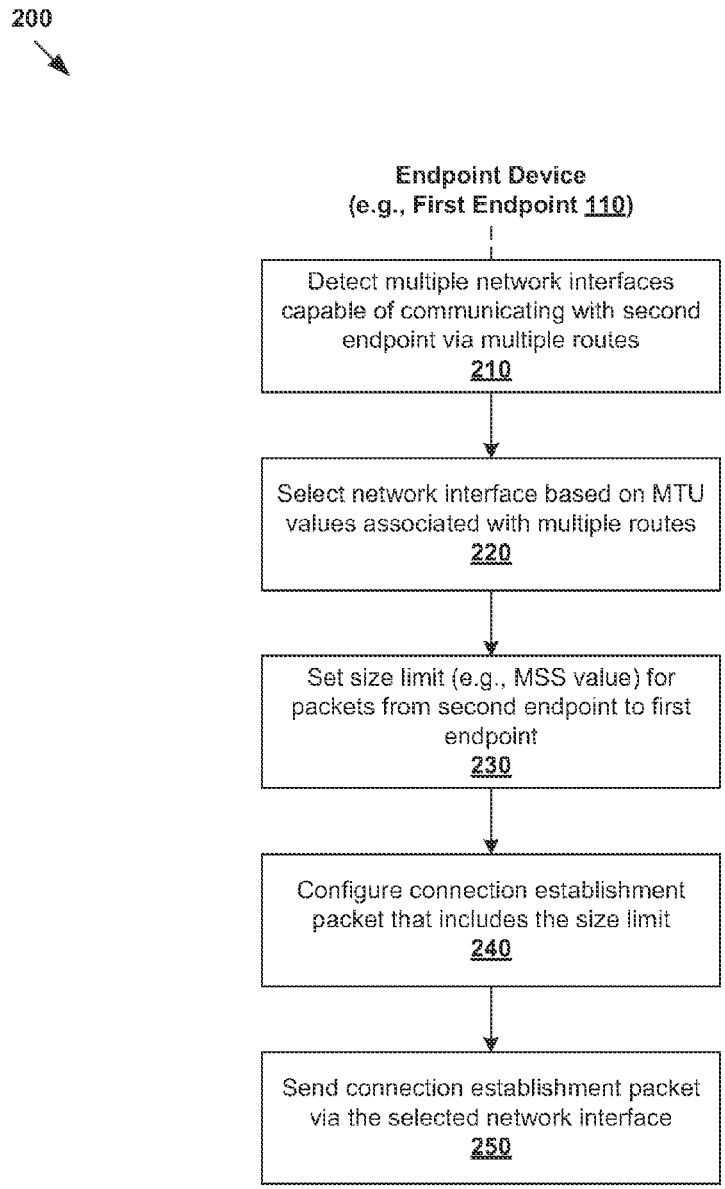
FIG. 2 is a flow chart of an example process to perform egress network interface selection for establishing a network connection.

In more detail, FIG. 2 is a flow chart of an example process 200 to perform egress network interface selection for a network connection. In the following examples, the network connection is a TCP connection, but any other suitable protocol may be used. Example process 200 may include one or more operations, functions, or actions illustrated by one or more blocks, such as blocks 210 to 250. The various blocks may be combined into fewer blocks, divided into additional blocks, and/or eliminated based upon the desired implementation.

At block 210 in FIG. 2, first endpoint 110 detects multiple egress network interfaces that are capable of communicating with second endpoint 120 via multiple routes. In the example in FIG. 1, first endpoint 110 may communicate with second endpoint 120 via first route "R1" 140 that involves "NIC1" 112 or via second route "R2" 142 that involves "NIC2" 114. As will be described using FIG. 4 and FIG. 5, block 210 may further include first endpoint 110 querying routing table 160 using an IP address of second endpoint 120 to retrieve matching entries associated with multiple routes.

At block 220 in FIG. 2, first endpoint 110 selects one of the multiple egress network interfaces based on MTU values associated with the multiple routes. In the example in FIG. 1, first route "R1" 140 involving "NIC1" 112 is associated with MTU=1500 bytes and second route "R2" 142 involving "NIC2" 114 is associated with MTU=9000 bytes. Based on the MTU values, "NIC2" 114 may be selected for faster throughput and improved bandwidth efficiency.

At block 230 in FIG. 2, first endpoint 110 sets a size limit for packets transmitted from second endpoint 120 to first endpoint 110 during the network connection. For a TCP connection, the size limit is the form of an MSS value, which generally excludes the size of the TCP and IP headers (e.g., 20 bytes each). In one example that will be described in more detail using FIG. 4, the MSS value of a SYN packet may be set based on the MTU value of the selected egress network interface. In the example in FIG. 1, once "NIC2" 114 is selected, first endpoint 110 sets MSS=9000 bytes based on the MTU value associated with second route "R2" 142 involving "NIC2" 114. In further examples that will be described in more detail using FIG. 5 and FIG. 6, the MSS value of a SYN-ACK packet may be set based on the MTU value of an ingress network interface via which a SYN packet is received.

At blocks 240 and 250 in FIG. 2, first endpoint 110 configures a connection establishment packet that includes the size limit (e.g., MSS value) and sends it to second endpoint 120 via the selected network interface. In the example in FIG. 1, example connection establishment packet 150 is configured and sent via selected "NIC2" 114. For TCP connections, packet 150 may be a SYN packet if the establishment is initiated by first endpoint 110 (i.e., first endpoint 110 acting as an AEP), or otherwise a SYN-ACK packet if the establishment is initiated by second endpoint 120 (i.e., first endpoint 110 acting as a PEP). Example connection establishment packet 150 will be discussed further using FIG. 3.

Using example process 200, first endpoint 110 is able to consider different routes to second endpoint 120 (e.g., "R1"

140 and "R2" 142) before selecting one of the associated network interfaces (e.g., "NIC2" 114). For example, even when "R1" 140 is configured as a static route (see 162), "R2" 142 may be selected for better throughput (see 164). As explained using FIG. 1, the static route is not always optimally configured or has the optimal MTU value for a TCP connection. Selecting "NIC2" 114 instead of "NIC1" 112 allows first endpoint 110 to send data using larger packets of 9000 bytes (instead of 1500 bytes. Also, setting MSS=9000 bytes (instead of 1500 bytes) based on the MTU of "NIC2" 114 allows second endpoint 120 to send larger packets to first endpoint 110. This improves throughput and bandwidth efficiency during the TCP connection.

Example process 200 may be implemented in any suitable network environment where endpoints have multiple network interfaces, such as a virtualized computing environment. Unlike conventional devices (e.g., personal computers) that usually have one network interface, physical devices in a virtualized computing environment are used to support a large number (e.g., tens or hundreds) of virtual machines and therefore require additional network interfaces. As explained using FIG. 1, this may create a new problem not previously observed in conventional network environments.

Further, since example process 200 does not require any new operations, functions or actions by intermediate device 130, example process 200 may be implemented without necessitating any changes (e.g., software and/or hardware) at intermediate device 130. This means intermediate devices 130 do not have to be updated or replaced, which reduces the implementation costs because there may be a large number of intermediate devices 130 connecting first endpoint 110 and second endpoint 120. Also, example process 200 may be implemented by first endpoint 110 to establish a TCP connection with existing second endpoint 120 that does not necessarily implement example process 200, especially when second endpoint 120 only has one network interface (e.g., "NIC3" 122 in FIG. 1).

Although first endpoint 110 is shown to have two network interfaces, it will be appreciated that any alternative or additional network interfaces may be used in practice. This also applies to second endpoint 120, which may have multiple network interfaces instead of one. Example process 200 in FIG. 2 may be used in conjunction with any suitable path MTU (PMTU) discovery approaches to consider the PMTU of a path between first endpoint 110 and second endpoint 120 when setting the MSS value and configuring SYN and SYN-ACK packets.

In the following, various examples will be discussed with reference to FIG. 3, to FIG. 6. In particular, an example connection establishment packet will be explained using FIG. 3, and example egress network interface selection using FIG. 4, FIG. 5 and FIG. 6. The examples may be implemented by first endpoint 110 and second endpoint 120 using respective protocol stacks 118, 128, or any alternative and/or additional component(s). Although a TCP connection is used as an example, any other suitable protocol may be used.

Connection Establishment Packet

Figure 3:
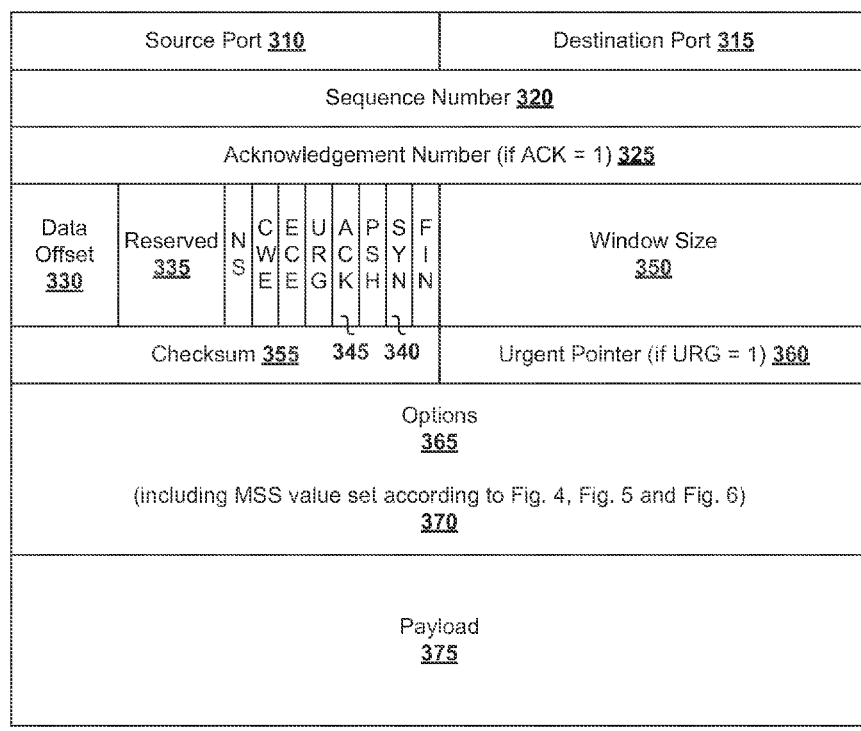
FIG. 3 is an example connection establishment packet configured according to the example process in FIG. 2.

FIG. 3 is a schematic diagram of example connection establishment packet 150/300 configured according to example process 200 in FIG. 2. In practice, example packet 300 may include alternative or additional fields based upon the desired implementation. In FIG. 3, example packet 300 includes suitable header information, such as source port 310, destination port 315, sequence number 320, acknowledgement number 325, data offset 330, reserved field 335, various flags (e.g., SYN flag 340 and ACK flag 345), window size 350, checksum 355, urgent pointer 360, and options 365. Payload information 370 follows the header information.

A SYN packet may be configured by setting SYN flag 340 (i.e., SYN=1). A SYN-ACK packet may be configured at block 240 by setting both SYN flag 340 and ACK flag 345 (i.e., SYN=1 and ACK=1). An ACK packet by may also be configured by setting ACK flag 345 (i.e., ACK=1). Depending on whether second endpoint 120 or first endpoint 110 initiates the connection, connection establishment packet 300 may be a SYN packet or SYN-ACK packet. When SYN flag 340 is set in the SYN or SYN-ACK packet, options field 365 may include MSS value 370 that is set by first endpoint 110 according to block 230 in FIG. 2, as well as block 450 in FIG. 4, block 550 in FIG. 5 and block 650 in FIG. 6 that will be further discussed below.

Network Interface Selection—First Example

Figure 4:
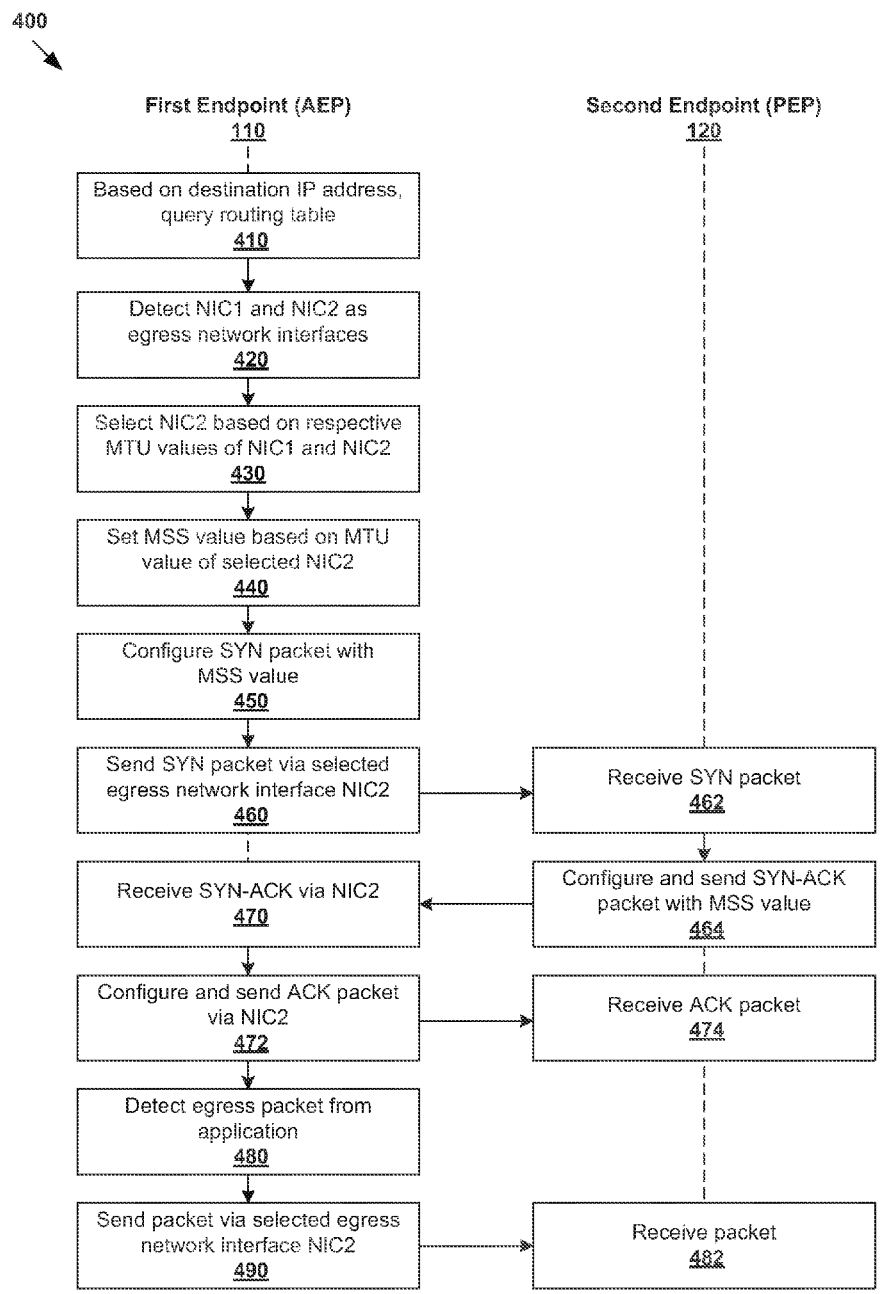
FIG. 4 is a flow chart of a first example detailed process to perform egress network interface selection for a TCP connection.

FIG. 4 is a flow chart of first example detailed process 400 to perform egress network interface selection for a TCP connection. In this example, the implementation is illustrated using one or more operations, functions, or actions represented by 410 to 490. The various operations, functions, or actions may be combined, divided, and/or eliminated based upon the desired implementation. Example process 400 may be implemented by first endpoint 110 and second endpoint 120 using any suitable component(s), such as protocol stacks 118, 128 respectively.

Using the example in FIG. 1, "NIC1" 112 at first endpoint 110 is configured with MTU=1500 bytes and IP address=10.10.112.1; and "NIC2" 114 with MTU=9000 bytes and IP address=10.10.114.1. Also, "NIC3" 122 at second endpoint 120 is configured with MTU=9000 bytes and IP address=20.20.20.1. In this example, first endpoint 110 serves as the AEP that initiates a TCP connection with second endpoint 120 as the PEP.

At block 410 in FIG. 4 (related to block 210 in FIG. 2), first endpoint 110 determines an IP address (i.e., 20.20.20.1 of "NIC3" 122) associated with second endpoint 120, which will be used as the destination IP address in SYN packet. The destination IP address is also used to query local routing table 160 to retrieve matching entries. For example in FIG. 1, routing table 160 stores routing information that describes how first endpoint 110 handles packets destined for a particular IP address. Destination IP address 20.20.20.1 may be matched to entries 162 and 164 in routing table 160 that represent different routes.

In particular, entry 162 represents first route "R1" 140 via "NIC1" 112 in FIG. 1, which is a static route with a subnet mask of 255.255.255.0. Entry 164 represents second route "R2" 142 via "NIC2" 114, which is a default route with a subnet mask of 0.0.0.0. In general, a subnet mask is a bitmask that is applied to determine whether an IP address matches with an entry in routing table 160. Conventionally, a "best-match" approach is usually used to select the most specific route as defined by the longest subnet mask that matches with the IP address. As such, conventionally, entry 162 will be selected as the most specific route to reach second endpoint 120.

According to example process 400, however, the MTU value associated with each route r="R1" or "R2" is considered. At blocks 420 and 430, first endpoint 110 detects multiple egress network interfaces (i.e., "NIC1" 112 and "NIC2" 114) that are capable of communicating with second endpoint 120 and performs a selection based on respective MTU values of the egress network interfaces. For example, first endpoint 110 may determine MTU(r) for each route r involving network interface n. In practice, MTU(r) may be limited by a Route MTU (RMTU) value and an Interface MTU (IMTU) value. The RMTU and IMTU values are usually configured by network administrators, manufacturers (e.g., default settings), etc.

The RMTU value represents the MTU value configured for route r. The RMTU values are typically configured in routing table 160, while IMTU values are configured at network interfaces "NIC1" 112, "NIC2" 114 and "NIC3" 122. For example, in routing table 160, RMTU(R1)=1500 bytes (see 162 in FIG. 1) and RMTU(R2)=9000 bytes (see 164 in FIG. 1). The IMTU value represents the MTU value configured for a network interface, such as IMTU(R1) =MTU(NIC1)=1500 and IMTU(R2)=MTU(NIC2)=9000. For simplicity, RMTU and IMTU are assumed to be the same, i.e., RMTU(R1)=IMTU(R1)=1500 bytes and RMTU (R2)=IMTU(R2)=9000 bytes. In this case, the MTU values for different routes may be determined as follows:

$$MTU(R1)=\min(RMTU(R1), IMTU(R1)]=1500 \text{ bytes;}$$

$$MTU(R2)=\min(RMTU(R2), IMTU(R2))=9000 \text{ bytes.}$$

In the above examples, since RMTU(R1)=IMTU(R1), MTU(R1) may also be calculated based on either RMTU (R1) or IMTU(R1). The same applies to MTU(R2). In practice, RMTU and IMTU may be configured to have different values to take into account additional network processing such as encryption and encapsulation that may increase the packet size due to additional header or security bits.

At blocks 430 and 440 in FIG. 4, first endpoint 110 selects "NIC2" 114 based on the larger MTU(R2)=9000 bytes associated with second route "R2" 142, and sets the MSS value to be less than or equal to MTU(R2)=9000 bytes. In general, the MSS value may be calculated as follows:

$$MSS \leq \max [\min(RMTU(r), IMTU(r))] \text{ for } r=R1, R2, \text{ etc.}$$

At blocks 450 and 460 in FIG. 4, first endpoint 110 configures a SYN packet with MSS=9000 bytes and sends the SYN packet via "NIC2" 114 (i.e., selected egress network interface). The SYN packet is configured with source IP address=10.10.114.1 (i.e., IP address of "NIC2" 114) and destination IP address=20.20.20.1 (i.e., IP address of "NIC3" 122). At block 462 in FIG. 4, second endpoint 120 receives the SYN packet and learns that MSS=9000 bytes, which cannot be exceeded by the largest amount of data from second endpoint 120 to first endpoint 110.

At blocks 464, 470, 472 and 474 in FIG. 4, second endpoint 120 responds to the SYN packet with a SYN-ACK packet (i.e., with MSS=9000 bytes based on the MTU of "NIC3" 122), first endpoint 110 receives the SYN-ACK packet and responds with an ACK packet. The SYN-ACK packet is configured with source IP address=20.20.20.1 (i.e., IP address of "NIC3" 122) and destination IP address=10.10.114.1 (i.e., IP address of "NIC2" 114). The ACK packet is configured with source IP address=10.10.114.1 (i.e., IP address of "NIC2" 114) and destination IP address=20.20.20.1 (i.e., IP address of "NIC3" 122).

Once the TCP connection is established, first endpoint 110 sends data packets (e.g., from application 116) up to second endpoint's 120 MSS=9000 bytes via selected "NIC2" 114 having MTU=9000 bytes. The packets are configured with source IP address=10.10.114.1 (i.e., IP address of "NIC2" 114) and destination IP address=20.20.20.1 (i.e., IP address of "NIC3" 122). See blocks 480 and 490 in FIG. 4. Similarly (not shown for simplicity), second endpoint 120 sends data packets up to first endpoint's 110 MSS=9000 bytes via "NIC3" 122.

Network Interface Selection—Second Example

Figure 5:
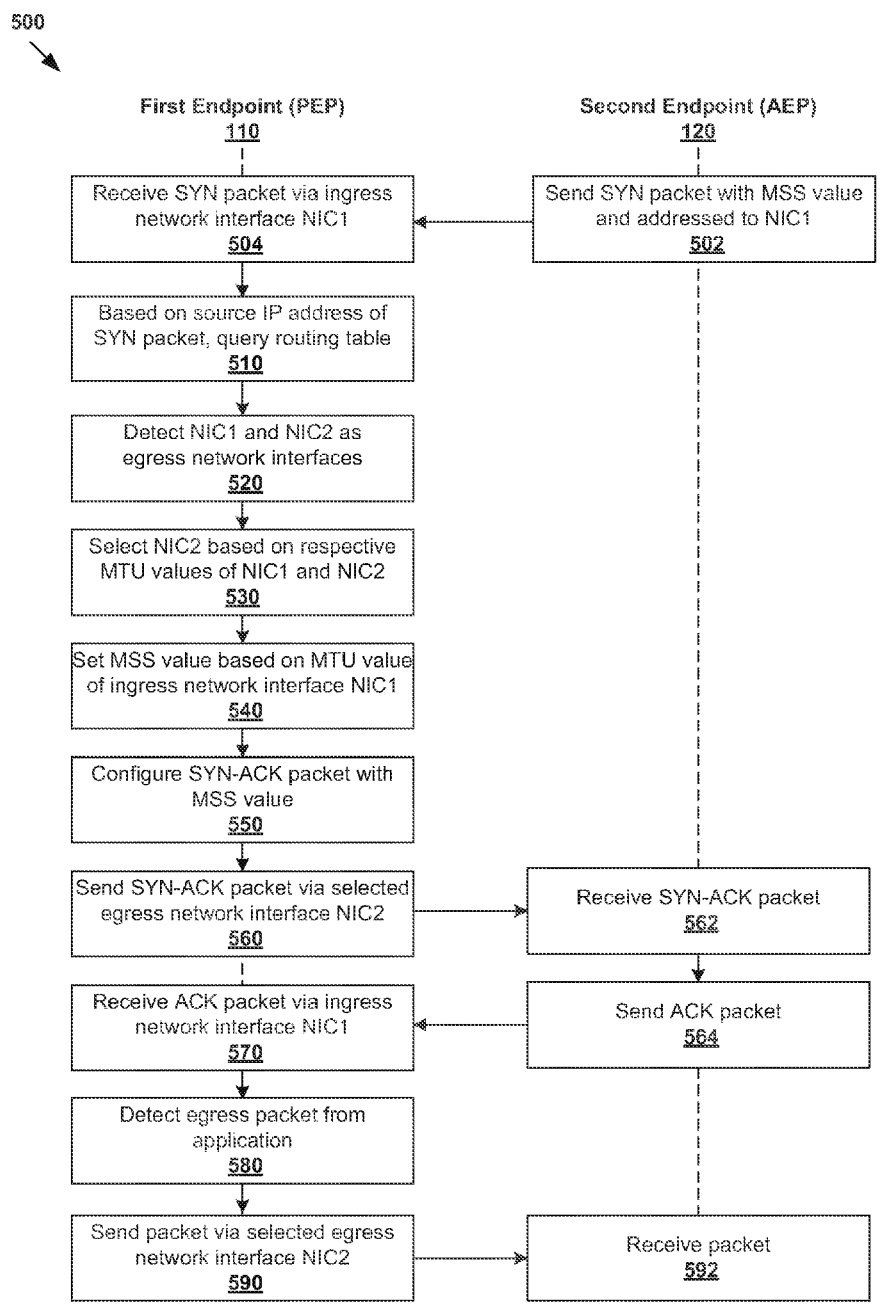
FIG. 5 is a flow chart of a second example detailed process to perform egress network interface selection for a TCP connection.

FIG. 5 is a flow chart of second example detailed process 500 to perform egress network interface selection for a TCP connection. In this example, the implementation is illustrated using one or more operations, functions, or actions represented by 502 to 590. The various operations, functions, or actions may be combined, divided, and/or eliminated based upon the desired implementation.

Compared to the first example in FIG. 4, second endpoint 120 as the AEP and first endpoint 110 (more particularly "NIC1" 112) as the PEP. At block 502 in FIG. 5, second endpoint 120 sends first endpoint 110 with a SYN packet with MSS value set according to the MTU=9000 bytes of "NIC3" 122. The SYN packet is configured with source IP address=20.20.20.1 (i.e., IP address of "NIC3" 122) and destination IP address=10.10.112.1 (i.e., IP address of ingress network interface "NIC1" 112).

At block 504 in FIG. 5, first endpoint 110 receives the SYN packet from second endpoint 120 via ingress network interface "NIC1" 112 and prepares to respond with a SYN-ACK packet. In particular, at block 510 in FIG. 5, based on the source IP address in the SYN packet (i.e., IP address=20.20.20.1 of "NIC3" 122), first endpoint 110 queries routing table 160 to determine available routes to second endpoint 120. See also 162 for "R1" 140 and 164 for "R2" 142 in FIG. 1.

At blocks 520 and 530 in FIG. 5, based on the query, first endpoint 110 detects egress network interfaces "NIC1" 112 and "NIC2" 114 and based on their MTU values, selects "NIC2" 114 as the egress network interface. As discussed at block 430 in FIG. 4, "NIC2" 114 is selected based on MTU=9000 bytes, which is larger than MTU=1500 bytes of "NIC1" 112. As such, in this case, "NIC1" 112 serves as the ingress network interface and "NIC2" 114 as the selected egress network interface.

At blocks 540 and 550 in FIG. 5, since the SYN packet from second endpoint 120 is addressed to 10.10.112.1 (i.e., IP address of ingress network interface "NIC1" 112), first endpoint 110 configures a SYN-ACK packet having an MSS value set based on the MTU=1500 bytes of "NIC1" 112. At block 560 in FIG. 5, first endpoint 110 sends the SYN-ACK packet via the selected egress network interface "NIC2" 114. The SYN-ACK packet is configured with source IP address=10.10.112.1 (i.e., IP address of ingress network interface "NIC1" 112) and destination IP address=20.20.20.1 (i.e., IP address of "NIC3" 122).

At blocks 562, 564 and 570 in FIG. 5, second endpoint 120 receives the SYN-ACK packet from first endpoint 110 and responds with an ACK packet to complete the TCP handshake. The ACK packet is configured with source IP address=20.20.20.1 (i.e., IP address of "NIC3" 122) and destination IP address=10.10.112.1 (i.e., IP address of ingress network interface "NIC1" 112).

At blocks 580 and 590 in FIG. 5, once the TCP connection is established, first endpoint 110 may send packets (e.g., from application 116) to second endpoint 120 via selected egress network interface "NIC2" 114. The packets are configured with source IP address=10.10.112.1 (i.e., IP address of ingress network interface "NIC1" 112) and destination IP address=20.20.20.1 (i.e., IP address of "NIC3" 122). However, since the packets are sent via "NIC2" 114 instead of "NIC1" 112, the packets may be up to the MSS=9000 bytes of second endpoint 120 and MTU=9000 bytes of selected egress network interface "NIC2" 114.

Network Interface Selection—Third Example

Figure 6:
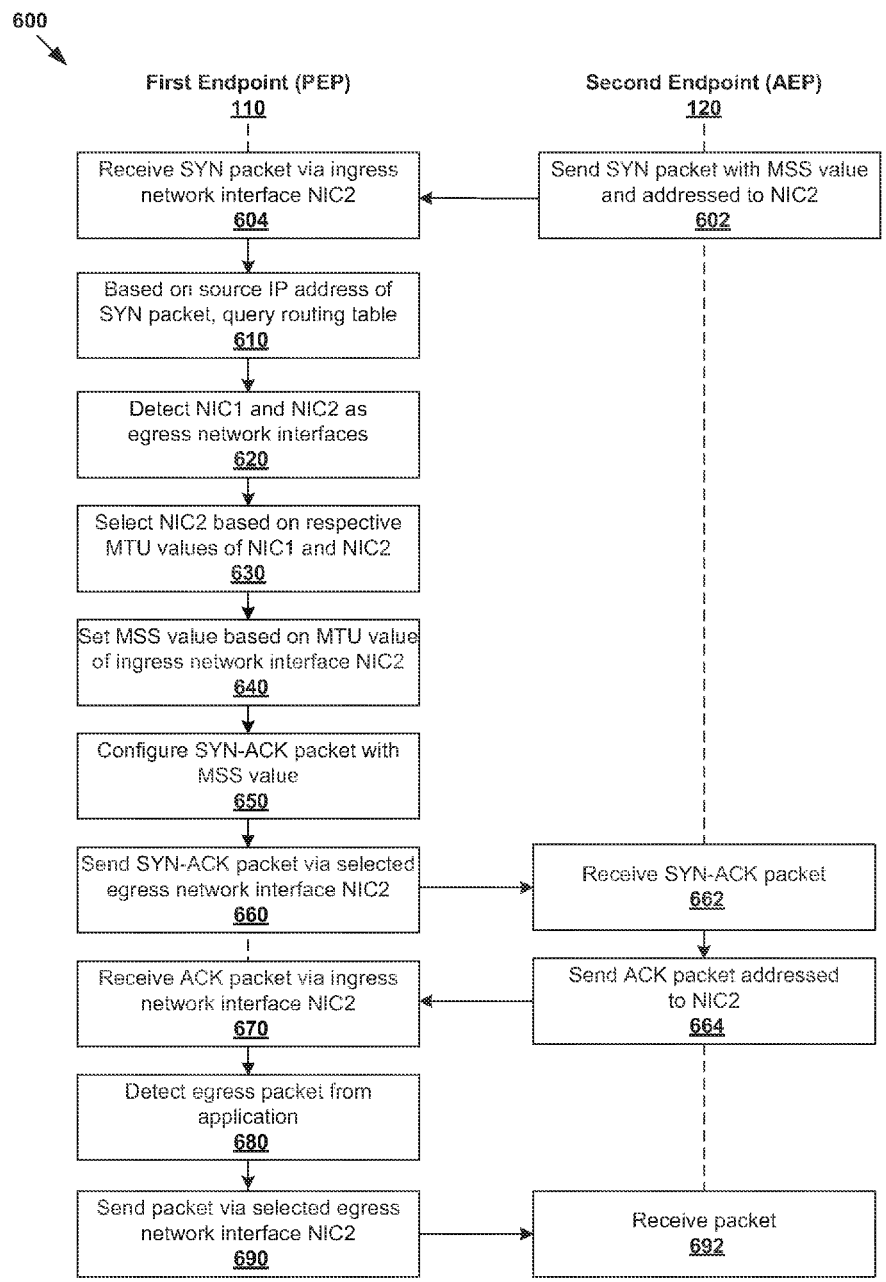
FIG. 6 is a flow chart of a third example detailed process to perform egress network interface selection for a TCP connection.

FIG. 6 is a flow chart of third example detailed process 600 to perform network interface selection for a TCP connection. In this example, the implementation is illustrated using one or more operations, functions, or actions represented by 602 to 692. The various operations, functions, or actions may be combined, divided, and/or eliminated based upon the desired implementation.

Compared to the second example in FIG. 5, second endpoint 120 as the AEP and first endpoint 110 (more particularly "NIC2" 114 instead of "NIC1" 112) as the PEP. At block 602 in FIG. 6, second endpoint 120 sends first endpoint 110 with a SYN packet with MSS value set according to the MTU=9000 bytes of "NIC3" 122. The SYN packet is configured with source IP address=20.20.20.1 (i.e., IP address of "NIC3" 122) and destination IP address=10.10.114.1 (i.e., IP address of "NIC2" 114).

At block 604 in FIG. 6, first endpoint 110 receives the SYN packet from second endpoint 120 via ingress network interface "NIC2" 114 and prepares to respond with a SYN-ACK packet. In particular, at block 610 in FIG. 6, based on the source IP address in the SYN packet (i.e., IP address=20.20.20.1 of "NIC3" 122), first endpoint 110 queries routing table 160 to determine available routes to second endpoint 120. See also 162 for "R1" 140 and 164 for "R2" 142 in FIG. 1.

At blocks 620 and 630 in FIG. 6, based on the query, first endpoint 110 detects egress network interfaces "NIC1" 112 and "NIC2" 114 and based on their MTU values, selects "NIC2" 114 as the egress network interface. As discussed at block 430 in FIG. 4, "NIC2" 114 is selected based on MTU 32 9000 bytes, which is larger than MTU=1500 bytes of "NIC1" 112. As such, in this case, "NIC2" 114 serves as both the ingress network interface and selected egress network interface.

At blocks 640 and 650 in FIG. 6, since the SYN packet from second endpoint 120 is addressed to destination IP address=10.10.114.1 (i.e., IP address of ingress network interface "NIC2" 114), first endpoint 110 configures a SYN-ACK packet having an MSS value set based on the MTU=9000 bytes of "NIC2" 114. The SYN-ACK packet is configured with source IP address=10.10.114.1 (i.e., IP address of "NIC2" 114) and destination IP address=20.20.20.1 (i.e., IP address of "NIC3" 122). At block 660 in FIG. 6, first endpoint 110 sends the SYN-ACK packet via the selected egress network interface "NIC2" 114.

At blocks 662, 664 and 670 in FIG. 6, second endpoint 120 receives the SYN-ACK packet from first endpoint 110 and responds with an ACK packet to complete the TCP handshake. The ACK packet is configured with source IP address=20.20.20.1 (i.e., IP address of "NIC3" 122) and destination IP address=10.10.114.1 (i.e., IP address of "NIC2" 114).

At blocks 680 and 690 in FIG. 6, once the TCP connection is established, first endpoint 110 may send data packets (e.g., from application 116) to second endpoint 120 via selected egress network interface "NIC2" 114. In particular, the packets may be up to the MSS=9000 bytes of second endpoint 120 and MTU=9000 bytes of selected egress network interface "NIC2" 114. The data packets are configured with source IP address=10.10.114.1 (i.e., IP address of "NIC2" 114) and destination IP address=20.20.20.1 (i.e., IP address of "NIC3" 122).

The above examples can be implemented by hardware (including hardware logic circuitry), software or firmware or a combination thereof. For example, first endpoint 110, second endpoint 120 and intermediate device 130 may be implemented by any suitable network device, which may include processor and memory that may communicate with each other via a bus, etc. The network device may include a non-transitory computer-readable medium having stored thereon instructions that, when executed by the processor, cause the processor to perform processes described herein with reference to FIG. 1 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

I claim:

1. A method for a first endpoint device to perform egress network interface selection for a network connection with a second endpoint device, the method comprising:
    detecting multiple egress network interfaces of the first endpoint device that are capable of communicating with the second endpoint device via multiple routes, wherein each route involving one of the multiple egress network interfaces is defined in a routing table;
    selecting, from the multiple egress network interfaces, an egress network interface of the first endpoint device by comparing multiple maximum transmission unit (MTU) values associated with the multiple routes that are queried from the routing table;
    setting a size limit for packets transmitted from the second endpoint device to the first endpoint device based on the maximum MTU value among the multiple MTU values, wherein the maximum MTU value is associated with the selected egress network interface of the first endpoint device during the network connection;
    generating a connection establishment packet that includes the size limit to establish the network connection; and
    before sending a data packet to the second endpoint device, sending the connection establishment packet to the second endpoint device via the selected egress network interface.

2. The method of claim 1, wherein selecting the egress network interface of the first endpoint device comprises:
    selecting the egress network interface of the first endpoint device based on a maximum MTU value among the multiple MTU values.

3. The method of claim 2, wherein selecting the egress network interface of the first endpoint device further comprises:
    determining each of the multiple MTU values based on a route MTU value configured for each of the multiple routes, an interface MTU value configured for each of the egress network interfaces, or a minimum between the route MTU value and the interface MTU value.

4. The method of claim 2, wherein the network connection is a Transport Control Protocol (TCP) connection, and the connection establishment packet is a synchronization (SYN) packet.

5. The method of claim 4, wherein setting the size limit comprises:
    setting a maximum segment size (MSS) value to be less than or equal to the maximum MTU value.

6. The method of claim 2, wherein the network connection is a Transport Control Protocol (TCP) connection, the connection establishment packet is a synchronization-acknowledgement (SYN-ACK) packet and setting the size limit comprises:
    setting the size limit based on an MTU value of an ingress network interface of the first endpoint via which a synchronization (SYN) packet is received from the second endpoint.

7. The method of claim 1, further comprising:
    after the network connection is established, sending data packets to the second endpoint via the selected egress network interface of the first endpoint device.

8. A non-transitory computer-readable storage medium that includes a set of instructions which, in response to execution by a processor of a first endpoint device, cause the processor to perform a method of egress network interface selection for a network connection with a second endpoint device, the method comprising:
    detecting multiple egress network interfaces of the first endpoint device that are capable of communicating with the second endpoint device via multiple routes, wherein each route involving one of the multiple egress network interfaces is defined in a routing table;
    selecting, from the multiple egress network interfaces, an egress network interface of the first endpoint device by comparing multiple maximum transmission unit (MTU) values associated with the multiple routes that are queried from the routing table;
    setting a size limit for packets to be transmitted from the second endpoint device to the first endpoint device based on the maximum MTU value among the multiple MTU values, wherein the maximum MTU value is associated with the selected egress network interface of the first endpoint device during the network connection;
    generating a connection establishment packet that includes the size limit to establish the network connection; and
    before sending a data packet to the second endpoint device, sending the connection establishment packet to the second endpoint device via the selected egress network interface.

9. The non-transitory computer-readable storage medium of claim 8, wherein selecting the egress network interface of the first endpoint device comprises:
    selecting the egress network interface of the first endpoint device based on a maximum MTU value among the multiple MTU values.

10. The non-transitory computer-readable storage medium of claim 9, wherein selecting the egress network interface of the first endpoint device further comprises:
    determining each of the multiple MTU values based on a route MTU value configured for each of the multiple routes, an interface MTU value configured for each of the egress network interfaces, or a minimum between the route MTU value and the interface MTU value.

11. The non-transitory computer-readable storage medium of claim 9, wherein the network connection is a Transport Control Protocol (TCP) connection, and the connection establishment packet is a synchronization (SYN) packet.

12. The non-transitory computer-readable storage medium of claim 11, wherein setting the size limit comprises:
    setting a maximum segment size (MSS) value to be less than or equal to the maximum MTU value.

13. The non-transitory computer-readable storage medium of claim 9, wherein the network connection is a Transport Control Protocol (TCP) connection, the connection establishment packet is a synchronization-acknowledgement (SYN-ACK) packet and setting the size limit comprises:
    setting the size limit based on an MTU value of an ingress network interface of the first endpoint via which a synchronization (SYN) packet is received from the second endpoint.

14. The non-transitory computer-readable storage medium of claim 8, further comprising:
    after the network connection is established, sending data packets to the second endpoint via the selected egress network interface of the first endpoint device.

15. A first endpoint device configured to perform egress network interface selection for a network connection, the first endpoint device comprising:
  a processor; and
  a non-transitory computer-readable medium having stored thereon instructions that, when executed by the processor, cause the processor to:
    detect multiple egress network interfaces of the first endpoint device that are capable of communicating with a second endpoint device via multiple routes, wherein each route involving one of the multiple egress network interfaces is defined in a routing table;
    select, from the multiple egress network interfaces, an egress network interface of the first endpoint device by comparing multiple maximum transmission unit (MTU) values associated with the multiple routes that are queried from the routing table;
    set a size limit for packets to be transmitted from the second endpoint device to the first endpoint device based on the maximum MTU value among the multiple MTU values, wherein the maximum MTU value is associated with the selected egress network interface of the first endpoint device during the network connection;
    generate a connection establishment packet that includes the size limit to establish the network connection; and
    before sending a data packet to the second endpoint device, send the connection establishment packet to the second endpoint device via the selected egress network interface.

16. The first endpoint device of claim 15, wherein instructions for selecting the egress network interface of the first endpoint device cause the processor to:
  select the egress network interface of the first endpoint device based on a maximum MTU value among the multiple MTU values.

17. The first endpoint device of claim 16, wherein instructions for selecting the egress network interface of the first endpoint device further cause the processor to:
  determine each of the multiple MTU values based on a route MTU value configured for each of the multiple routes, an interface MTU value configured for each of the egress network interfaces, or a minimum between the route MTU value and the interface MTU value.

18. The first endpoint device of claim 16, wherein the network connection is a Transport Control Protocol (TCP) connection, and the connection establishment packet is a synchronization (SYN) packet.

19. The first endpoint device of claim 18, wherein instructions for setting the size limit cause the processor to:
  set a maximum segment size (MSS) value to be less than or equal to the maximum MTU value.

20. The first endpoint device of claim 16, wherein the network connection is a Transport Control Protocol (TCP) connection, the connection establishment packet is a synchronization-acknowledgement (SYN-ACK) packet and instructions for setting the size limit cause the processor to:
  set the size limit based on an MTU value of an ingress network interface of the first endpoint via which a synchronization (SYN) packet is received from the second endpoint.

21. The first endpoint device of claim 15, wherein the instructions further cause the processor to:
  after the network connection is established, send data packets to the second endpoint via the selected egress network interface of the first endpoint device.

\* \* \* \* \*